US010146205B2

(12) United States Patent
Berghold et al.

(10) Patent No.: US 10,146,205 B2
(45) Date of Patent: Dec. 4, 2018

(54) METHOD FOR CHECKING THE POSITIONING ACCURACY OF A MACHINE PART THAT IS DISPLACEABLE WITH RESPECT TO AT LEAST ONE AXIS BY MEANS OF A DRIVE AND A CONTROLLER

(71) Applicant: Siemens Aktiengesellschaft, München (DE)

(72) Inventors: Ricky Berghold, Erlangen (DE); Lars Immenroth, Zwickau (DE); Robert Pulawski, Erlangen (DE); Johannes Welker, Neumarkt (DE)

(73) Assignee: Siemens Aktiengesellschaft, München (DE)

( * ) Notice: Subject to any disclaimer, the term of this patent is extended or adjusted under 35 U.S.C. 154(b) by 263 days.

(21) Appl. No.: 15/052,943

(22) Filed: Feb. 25, 2016

(65) Prior Publication Data

US 2016/0246286 A1    Aug. 25, 2016

(30) Foreign Application Priority Data

Feb. 25, 2015   (EP) .................................... 15156550

(51) Int. Cl.
*G05B 19/406* (2006.01)
*G01B 21/00* (2006.01)
*G05B 19/19* (2006.01)

(52) U.S. Cl.
CPC .......... *G05B 19/406* (2013.01); *G01B 21/00* (2013.01); *G05B 19/19* (2013.01); *G05B 2219/34185* (2013.01); *G05B 2219/39003* (2013.01); *G05B 2219/50185* (2013.01)

(58) Field of Classification Search
CPC ....... G05B 19/19; G05B 19/406; G01B 21/00
See application file for complete search history.

(56) References Cited

U.S. PATENT DOCUMENTS

| 5,111,590 A | * | 5/1992 | Park ...................... G01B 21/042 33/502 |
| 5,189,627 A | * | 2/1993 | Momochi .......... G05B 19/4103 318/573 |
| 5,313,147 A | | 5/1994 | Yoneda et al. |

(Continued)

FOREIGN PATENT DOCUMENTS

| CN | 1856691 A   | 11/2006 |
| CN | 101192059 A | 6/2008  |

(Continued)

*Primary Examiner* — Thomas L Dickey
(74) *Attorney, Agent, or Firm* — Henry M. Feiereisen LLC

(57) ABSTRACT

A method which allows an operator to quickly form a clear picture with regard to the positioning accuracy of a machine part that is displaceable along an axis by means a drive controlled by a controller includes specifying with the controller nominal position values of the machine part in relation to a single axis, wherein the nominal position values are defined by a sine function; displacing the machine part with respect to the single axis in accordance with the nominal position values; determining with a measuring device actual position values of the machine part in relation to the single axis; and visualizing the actual position values of the machine part in relation to the single axis graphically in a circular representation.

8 Claims, 4 Drawing Sheets

(56) References Cited

U.S. PATENT DOCUMENTS

| | | | | |
|---|---|---|---|---|
| 5,767,380 A * | 6/1998 | Haas | ............... | G01B 5/0002 |
| | | | | 33/502 |
| 6,498,653 B1 * | 12/2002 | Wang | ............... | G01B 11/005 |
| | | | | 356/498 |
| 9,827,674 B2 * | 11/2017 | Tronnier | ............... | B25J 9/1664 |
| 2003/0036868 A1 * | 2/2003 | Yutkowitz | ............... | G05B 19/404 |
| | | | | 702/105 |
| 2003/0056147 A1 * | 3/2003 | Yutkowitz | ............... | G05B 11/28 |
| | | | | 714/25 |
| 2005/0043849 A1 * | 2/2005 | Coleman | ............... | G05B 19/401 |
| | | | | 700/195 |
| 2007/0033819 A1 | 2/2007 | McFarland | | |
| 2009/0183610 A1 | 7/2009 | Maxted | | |
| 2013/0304247 A1 * | 11/2013 | Mackman | ............... | G05B 19/406 |
| | | | | 700/174 |
| 2015/0052767 A1 | 2/2015 | Sagemueller | | |

FOREIGN PATENT DOCUMENTS

| | | |
|---|---|---|
| CN | 101976056 A | 2/2011 |
| CN | 104246429 A | 12/2014 |
| DE | 19637632 A1 | 4/1997 |

* cited by examiner

METHOD FOR CHECKING THE POSITIONING ACCURACY OF A MACHINE PART THAT IS DISPLACEABLE WITH RESPECT TO AT LEAST ONE AXIS BY MEANS OF A DRIVE AND A CONTROLLER

CROSS-REFERENCES TO RELATED APPLICATIONS

This application claims the priority of European Patent Application, Serial No. EP 15156550.4, filed Feb. 25, 2015, pursuant to 35 U.S.C. 119(a)-(d), the content of which is incorporated herein by reference in its entirety as if fully set forth herein.

BACKGROUND OF THE INVENTION

The present invention relates to a method for checking the positioning accuracy of a machine part that is displaceable with respect to at least one axis by means of a drive and a controller, wherein the machine part is displaced only with respect to the one axis in that the controller specifies nominal position values of the machine part in relation to the one axis.

The following discussion of related art is provided to assist the reader in understanding the advantages of the invention, and is not to be construed as an admission that this related art is prior art to this invention.

Among the methods known for checking the positioning accuracy of a CNC machine tool is the so-called circular test. With the circular test, at least two axes of the machine tool are controlled in such a way the tool center point (TCP) describes a circular path. In particular, the two axes are moved jointly by way of a circular interpolation. The circular interpolation generates a sine motion profile for one machine axis and a cosine motion profile for the other. The real actual position values of the tool center point are acquired by means of a measurement system and presented graphically in a circular representation. In order to enable the deviations of the real circular path from the likewise depicted ideal circular path to be more readily recognized, it is common practice to represent the deviations with respect to the ideal circular path in greatly magnified form. For the deviations in relation to the ideal circular path, a different scale is accordingly used, in particular a greatly magnified scale compared to the ideal circular path. Mechanical and dynamic errors of machine axes can be determined by means of the circular test.

The following problems occur with the cited approach:

a) Generally, not every machine axis can be interpolated in the circle together with every other one, which makes checking the positioning accuracy more difficult for such axes.

b) With different dynamic settings in the axes interpolating with one another, the influence of the different axis dynamics dominates the circular test and consequently the circular representation to such an extreme extent that the more minor mechanical contour errors that are caused e.g. due to friction or mechanical backlash are no longer recognizable as deviations in the circular representation.

c) When two machine axes that are mechanically coupled to one another are interpolated, it is not always possible—due to the mutual mechanical influence—for the contour errors detected in the machine axes to be assigned unequivocally to one of the two machine axes.

It would therefore be desirable and advantageous to obviate prior art shortcomings and to provide an improved method for checking the positioning accuracy in which the cited problems do not occur.

SUMMARY OF THE INVENTION

According to one aspect of the present invention, a method for checking a positioning accuracy of a machine part that is displaceable with respect to at least one axis by a drive controlled by a controller, includes the steps of specifying with the controller nominal position values of the machine part in relation to a single axis, wherein the nominal position values are defined by a sine function; displacing the machine part with respect to the single axis in accordance with the nominal position values; determining with a measuring device actual position values of the machine part in relation to the single axis; and visualizing the actual position values of the machine part in relation to the single axis graphically in a circular representation.

The invention is characterized in that in order to check the positioning accuracy of a machine part that is displaceable with respect to at least one axis by means of a drive and a controller, the machine part is displaced only with respect to the one axis in that the controller specifies nominal position values of the machine part in relation to the one axis in accordance with a sine function. A measuring device determines actual position values of the machine part in relation to the one axis. These are visualized graphically in relation to the one axis in a circular representation.

The invention is suitable both for checking the positioning accuracy of linear axes and for checking the positioning accuracy of rotary axes. When the method according to the invention is carried out, the positioning accuracy of precisely one axis of a machine is checked. Of course, the method can also be performed multiple times for a machine so that ultimately several or all axes of the machine can be checked in terms of their positioning accuracy.

The specified nominal position values over time follow a sine function. In an embodiment variant having a machine part that is movable along a linear axis, this results in a movement of the machine part back and forth along the linear axis, that is to say a linear motion with periodic inversion of direction. During the checking of the positioning accuracy of a rotary axis, the specification of the nominal position values (nominal angular positions) over time in accordance with a sine function results in a periodic pivoting of the machine part back and forth around the rotary axis.

The displacement of the machine part with respect to precisely one axis and the determination of the actual position values of the machine part in relation to precisely the one axis produce the following advantages:

a) Apart from the axis under consideration, there is no need to perform an interpolation for any other machine axis in order to identify the contour errors of a specific machine axis. This means that a circular test can be performed for any individual machine axis without restriction (in particular independently of a second axis).

b) The influence of dynamic settings no longer has an effect on the measurement or, as the case may be, the circular representation. The circular representation henceforth reveals only deviations caused by the mechanical contour errors.

c) The influence of mutual mechanical couplings between two machine axes no longer has an effect on the circular representation. The circular representation henceforth reveals only deviations caused by mechanical errors.

There are different possibilities available for generating the circular representation in order to visualize the contour errors. A first embodiment variant of the invention provides that in order to generate the circular representation, the deviation of the actual position value from the associated nominal position value is indicated in each case at specific angles of the sine function. In this case also, the deviation is advantageously plotted in a much larger scale than the circle itself. The deviations are therefore greatly magnified and consequently are easily identifiable. All the nominal position values lie on the ideal circle. This embodiment variant has the advantage that the circular representation can be generated with very low computational overhead.

An alternative embodiment variant provides that the actual position values are determined for at least one and a quarter periods of the sine function and stored, and that the circular representation comprises a coordinate system having a first axis and a second axis orthogonal thereto, and the actual position values are visualized graphically in that the determined actual position values represent coordinates in relation to the first axis and, for each coordinate in relation to the first axis, the associated coordinate in relation to the second axis is obtained in that for that purpose reference is made to the actual position value trailing by one quarter period duration with respect to the actual position value currently under consideration. This embodiment variant has the advantage that it is modeled more closely on the circular test from the prior art than the first embodiment variant. Furthermore, it is not necessary with this embodiment variant to calculate the sine function explicitly while the circular test is being performed. For example, appropriate values of the sine function could already be determined in advance and simply stored in a lookup table.

It is of course possible with the alternative embodiment variant also to make reference to any time instant trailing further by a multiple of the period duration with respect to the time instant and the actual position value associated therewith, in addition to the actual position value trailing by one quarter period duration.

As is usual with numerical controllers, it is also the case with the circular test according to the invention that only a finite number of nominal position values can be specified and that in this regard also only a finite number of actual position values can be determined. There is therefore a high probability that at a specific time instant, at which a nominal position value is specified and the associated actual position value is determined, there is no nominal or actual position value trailing by exactly one quarter period duration, since the time instant trailing by one quarter period duration does not lie in the specified time period in which nominal position values are output or actual position values are determined. The actual position value trailing by one quarter period duration is then determined by interpolation of the actual position value for the searched-for time instant from at least two actual position values determined (measured) around the time instant in question. Alternatively, the measured value that is closest to the time instant in question (trailing by one quarter period duration with respect to the time instant currently under consideration) could be called upon. The interpolation leads to more accurate results, however.

The circular test according to the invention is preferably visualized graphically for a complete period of the sine function in the circular representation. For this purpose it may be necessary (depending on the chosen method) to perform the test for one and a quarter periods. This will enable the deviations for the complete period, and consequently for a complete circle (360°), to be visualized graphically for the viewer.

Also encompassed by the invention in addition to the disclosed methods are a corresponding measuring device for checking the positioning accuracy and a numerical controller for carrying out the method in question.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
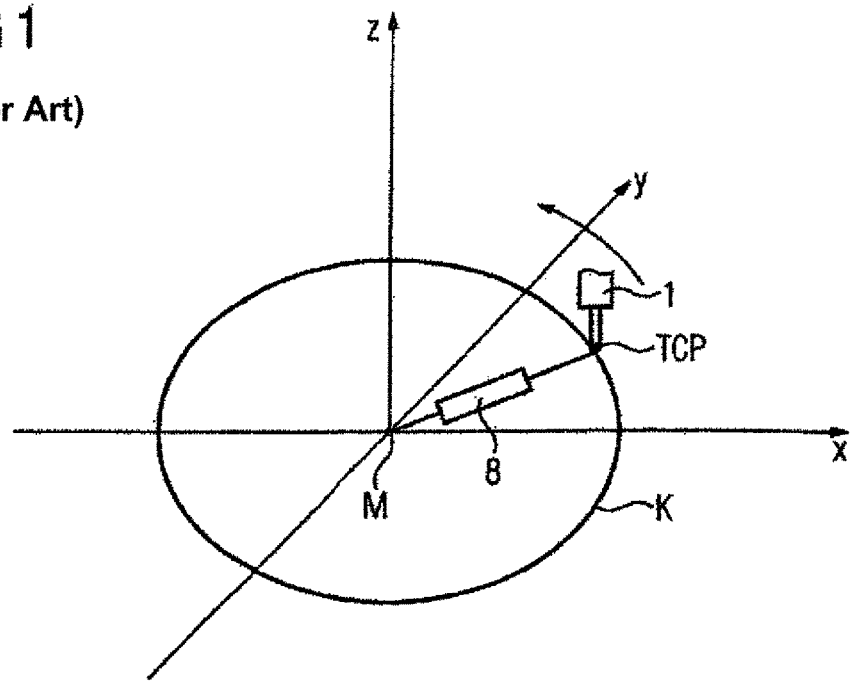
FIG. 1 shows a setup for performing the circular test according to the prior art.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a setup for performing a circular test according to the prior art in a greatly simplified schematic representation. In this arrangement, a machine part 1 is moved along a circular path by means of suitable drives (not shown) and a suitable controller (not shown). For this purpose, at least two machine axes are controlled in an interpolation. A pin-shaped object is attached to the machine part 1, the free end of the object being referred to as the TCP (Tool Center Point). The TCP moves in the x-y plane along a circular path K around the center point M of the circle. During the movement, a measuring sensor 2 determines the actual distance of the TCP from the center point M of the circle as a function of the angle that the measuring sensor 2 includes with the x-axis.

Figure 2:
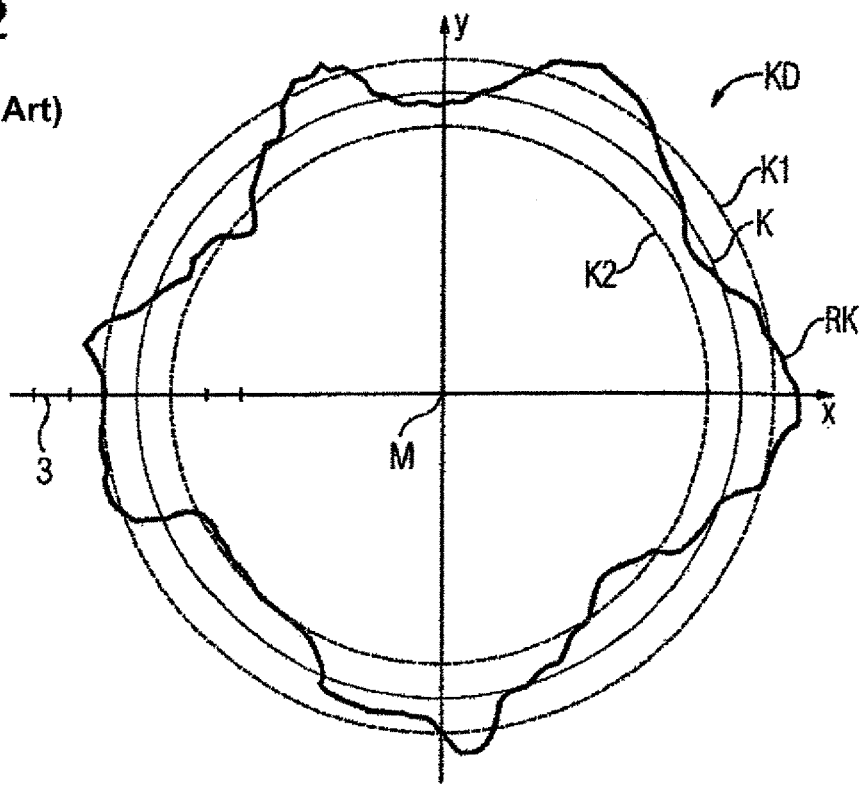
FIG. 2 shows a representation of the result of the circular test according to the prior art.

FIG. 2 illustrates the result of the measurement graphically in a representation that is typical of the circular test. It shows the axes x and y which span the x-y plane. The center point M of the circle lies at the point of intersection of the two axes. Also shown is an ideal circle K around the center point M as well as the two auxiliary circles K1 and K2 (indicated by dashed lines). All of the nominal position values specified by the controller lie on the (ideal) circle K. Also plotted are measurement points RK (real circle) that result from the measurement according to FIG. 1. Because the deviations of the measured actual position values from the specified nominal position values in high-precision machine tools are minutely small in relation to the circle radius, the deviations are represented in a different scale that is greatly magnified with respect to the axes. This is illustrated by means of the material measure 3. As a result of this representation it is now possible to recognize at a glance at which angle (in relation to the x-axis) the machine has a particularly high or a particularly low deviation from the specified nominal position values when performing a circular movement. As a result the person skilled in the art can very quickly gain an overview of the accuracy of the positioning control or, as the case may be, of the mechanics of the machine in question.

The modified circular test according to the invention is illustrated next in FIGS. 3 to 8. In this regard, FIGS. 3 to 5 depict the checking of the positioning accuracy of a linear axis, and FIGS. 6 to 8 the checking of the positioning accuracy of a rotary axis.

Figure 3:
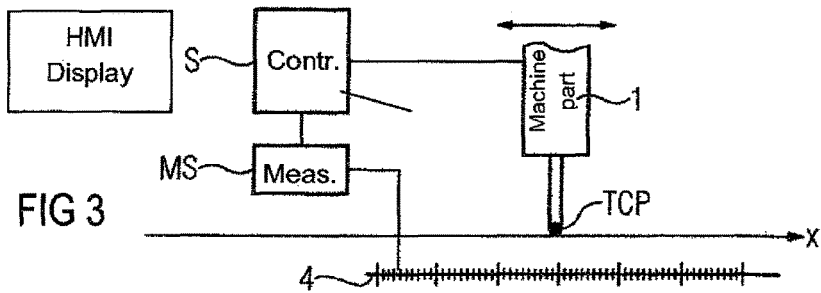
FIG. 3 shows a machine part that is movable along a linear axis.

FIG. 3 shows a machine part 1 which is moved back and forth periodically along the x-axis by means of a controller S and drives D connected thereto. For this purpose, the controller S specifies the corresponding nominal position values (setpoint positional values), which may be entered on a human-machine interface (HMI) connected to the controller S. A display which may be integrated in the HMI or separate therefrom displays, for example, the results of the circular test to be discussed below with reference to FIGS. 5 and 8. A measuring sensor MS having a material measure 4 measures the exact position of the TCP in relation to the x-axis (actual position values, also referred to as actual angular positions) as a function of time.

Figure 4:
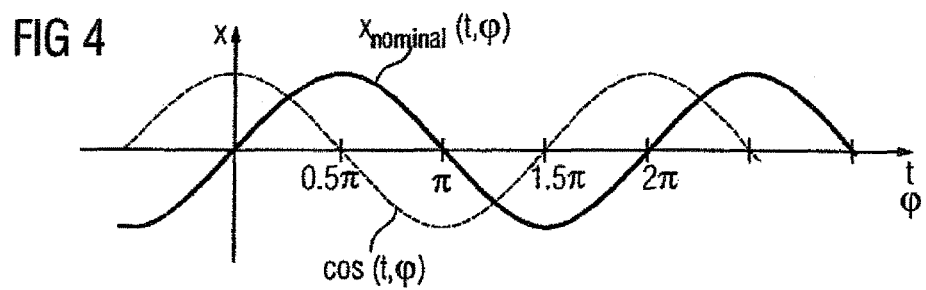
FIG. 4 shows the position of the machine part according to FIG. 3 with respect to time.
Figure 5:
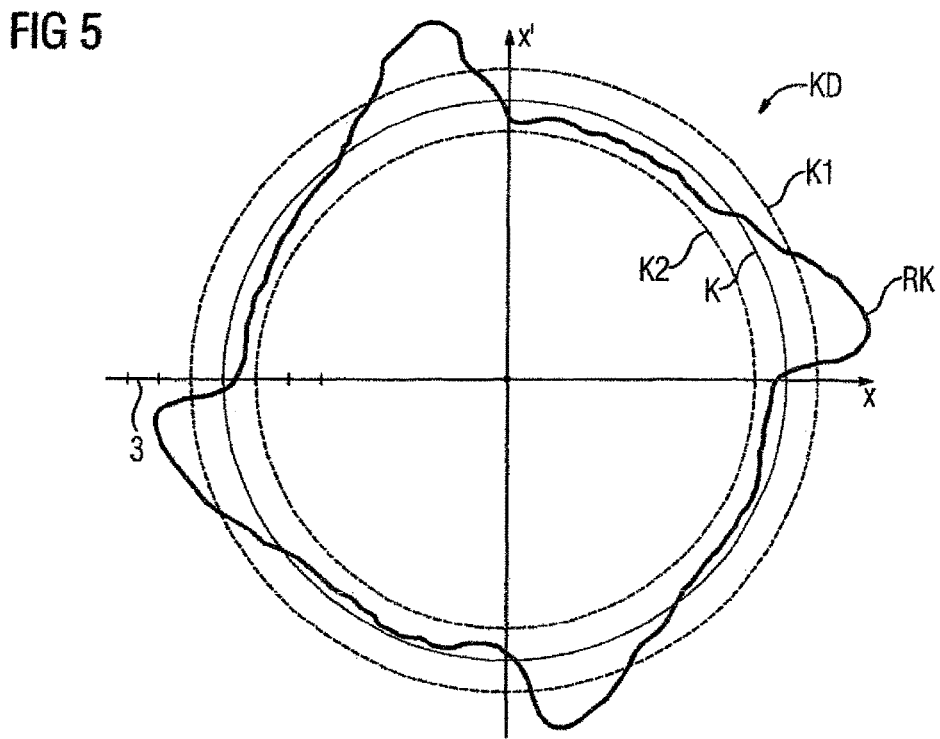
FIG. 5 shows the graphical visualization of the measured values determined by means of the circular test according to the invention.

FIG. 4 illustrates the specification of the nominal position values by the controller S in the form of a graph. The x position value (nominal position value) is plotted as a function of time t or, as the case may be, as a function of the angle $\varphi$ referred to the period duration (one period corresponds to an angle of 360°). It is apparent from this that the nominal position values $x_{nominal}(t, \varphi)$ are specified in accordance with a sine function. From this results the periodic movement of the machine part 1 back and forth along the one linear axis (x-axis).

Also shown in FIG. 4 is the cosine (t) or cosine ($\varphi$) function (dashed line), which leads the sine function by one quarter period. With regard to the embodiment variant of the invention in which, for each coordinate in relation to the first axis (x-axis), the associated coordinate in relation to the second axis (x'-axis) orthogonal to the first axis is yielded as a result of the fact that for that purpose reference is made to the actual position value determined one quarter of a period duration previously with respect to the actual position value currently under consideration, this corresponds to a transition from the sine function to the cosine function.

FIG. 5 now illustrates the result of the modified circular test according to the invention. In this case the x-axis is plotted a first time, and then a second time orthogonally thereto. In order to differentiate between the two, the latter is designated in the example as the "x'-axis". Also shown, as in the conventional circular test, are an ideal circle K having its center point M at the point of intersection of the two axes, as well as the two auxiliary circles K1 and K2 (indicated by dashed lines). Also depicted here once again in addition is the real circle RK, from which the deviations of the measured actual position values in relation to the specified nominal position values are evident. The deviations of the real circle RK with respect to the ideal circle K are likewise represented in a much greater scale than the radius of the circle K, illustrated by means of the material measure 3. The real circle RK is yielded in this case also either as a result of the fact that, for an x value specified in accordance with the sine function (nominal position value), the actual position value is plotted either at the associated angle $\varphi$, or an associated "x' coordinate" is calculated for each measured x position value and in this way the corresponding points in the x-x' plane are determined. The calculation of the x' coordinate is preferably carried out by referring to the actual position value trailing by one quarter period duration. If no actual position value trailing by exactly one quarter period duration has been determined due to the angle or time instant lying between two measurement points, then the actual position value is interpolated from at least two actually measured actual position values.

It is clear from FIG. 5 that the person skilled in the art can very quickly and clearly form a picture with regard to the accuracy of the machine in question, in particular a machine tool, also in relation to only one linear axis.

Figure 6:
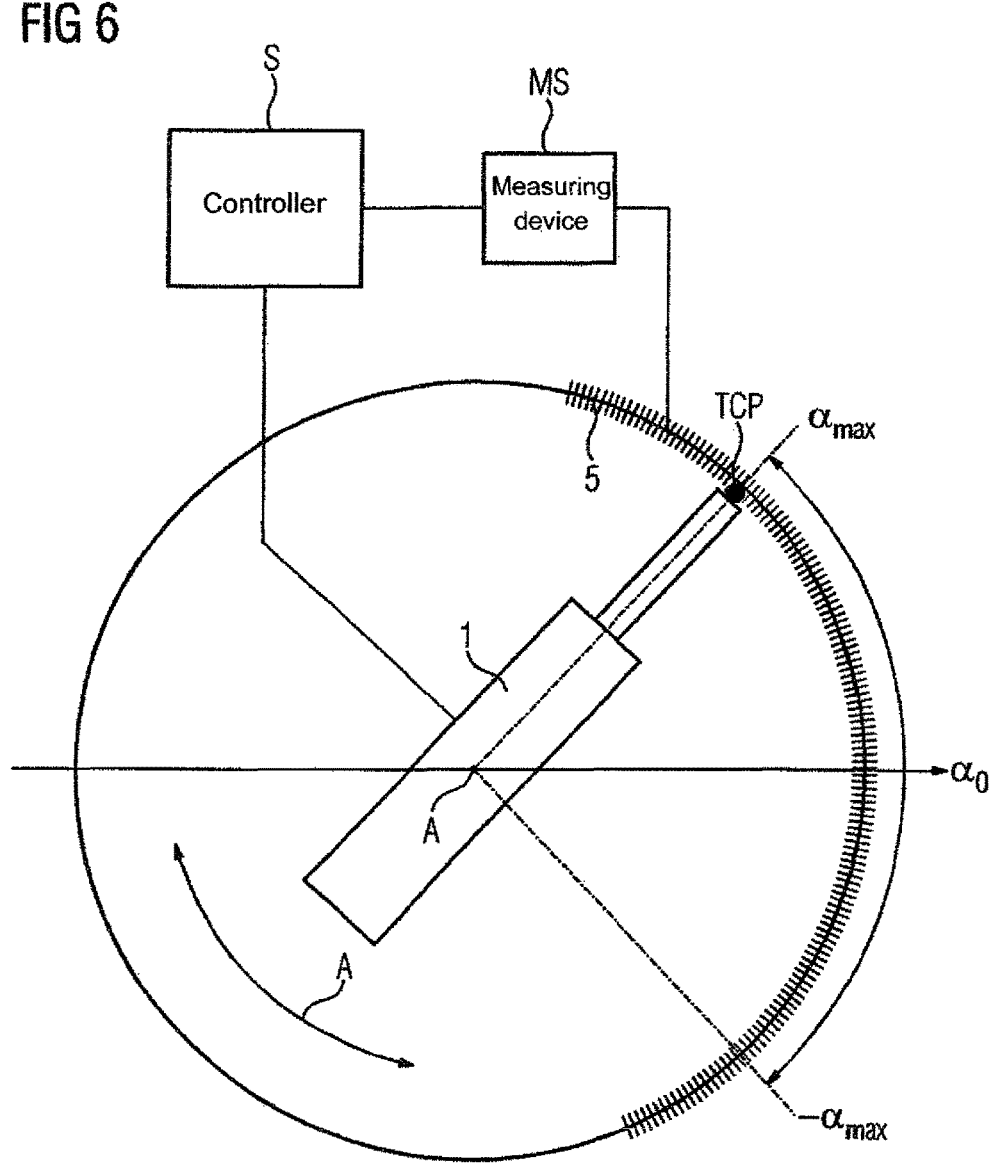
FIG. 6 shows a machine part that is pivotable about a rotary axis.

FIG. 6 shows a machine part 1 which is periodically pivoted about the rotary axis A by means of a controller S and drives connected thereto (not shown). The controller S specifies the corresponding nominal position values (nominal angular positions) for this purpose. A measuring sensor MS having a material measure 5 measures the exact angle (actual position value or actual angular position) of the TCP relative to a zero angle position, illustrated in the drawing by the axis $\alpha_0$, as a function of time.

Figure 7:
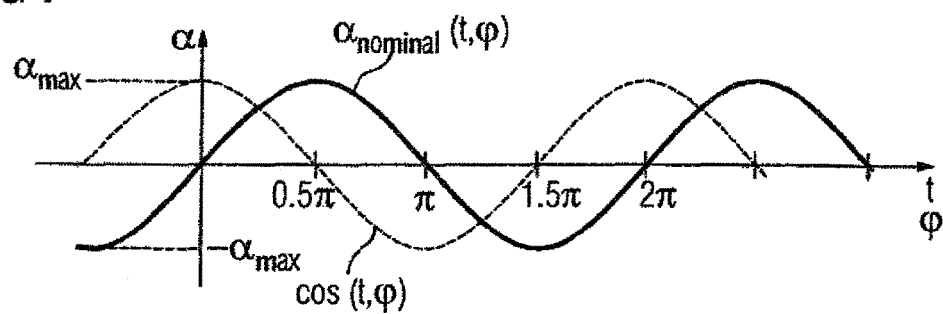
FIG. 7 shows the angular position of the machine part according to FIG. 6 with respect to time.

FIG. 7 illustrates the specification of the nominal angular positions by the controller S in the form of a graph. The angle $\alpha$ is plotted as a function of time t or as a function of the angle $\varphi$, referred to the period duration of the pivoting movement (one period corresponds to an angle $\varphi$ of 360°). It is apparent from this that the nominal angular positions $\alpha_{nominal}(t, \varphi)$ are specified in accordance with a sine function. This results in the periodic pivoting back and forth of the machine part 1 about the rotary axis A between a maximum angle $\alpha_{max}$ and a minimum angle $(-\alpha_{max})$ (referred to the arm or the axis $\alpha_0$).

Also shown in FIG. 7 is the cosine (t) or cosine ($\varphi$) function (dashed line), which leads the sine function by one quarter period. With regard to the embodiment variant of the invention in which, for each coordinate in relation to the first axis (A-axis), the associated coordinate in relation to the second axis (A'-axis) orthogonal to the first axis is yielded as a result of the fact that for that purpose reference is made to the actual angular position determined one quarter of a period duration previously with respect to the actual angular position currently under consideration, this corresponds to a transition from the sine function to the cosine function.

Figure 8:
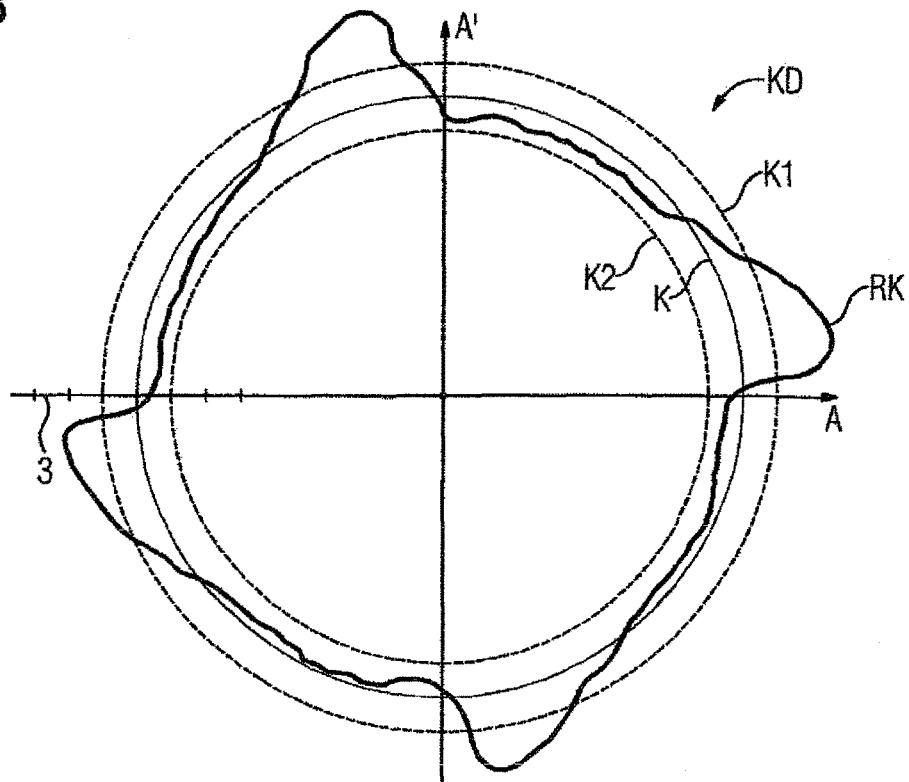
FIG. 8 shows the graphical visualization of the measured values determined by means of the circular test according to the invention.

FIG. 8 now illustrates the result of the modified circular test according to the invention for a rotary axis. In this case the zero angle position (A-axis) and an axis orthogonal thereto (A'-axis) are plotted. Also shown, as in the conventional circular test, are an ideal circle K having its center point M at the point of intersection of the two axes, as well as the two auxiliary circles K1 and K2 (indicated by dashed lines). Also depicted here once again in addition is the real circle RK, from which the deviations of the measured actual angular positions in relation to the specified nominal angular positions are evident. It should be noted in this regard that the deviation is plotted or represented for the respective angle of the sine function in the radial direction. If the deviation is equal to zero for a specific angle, then the point in question lies on the ideal circle. Deviations that are not equal to zero consequently result in a distance from the ideal circle. In the conversion of a specific angular deviation into a corresponding distance, a suitable scale should be chosen so that the deviation will be graphically readily identifiable. This can vary from machine to machine or from axis to axis. An appropriate scale is illustrated by way of example by the material measure 6. A deviation of the actual angular position $\alpha_{actual}(t, \varphi)$ from the nominal angular position $\alpha_{nominal}(t, \varphi)$ by a specific measure, for example 1/100 of a degree, is therefore represented in the circle diagram by a specific change in length in the radial direction, for example 1 mm, at the relevant angle $\varphi$ of the sine function.

The real circle RK is obtained by determining the actual angular positions $\alpha_{actual}(t, \varphi)$ for each nominal angular position $\alpha_{nominal}(t, \varphi)$ specified in accordance with the sine function, converting the same into a corresponding deviation in the radial direction and plotting them at the associated angle $\varphi$.

It is clear from FIG. 8 that the person skilled in the art can very quickly and clearly form a picture with regard to the accuracy of the machine in question, in particular a machine tool, also in relation to only one rotary axis that is to be checked.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for checking a positioning accuracy of a machine part that is displaceable with respect to at least one axis by a drive controlled by a controller, comprising:
   specifying with the controller nominal position values of the machine part in relation to a single axis, wherein the nominal position values are defined by a sine function,
   displacing the machine part with respect to the single axis in accordance with the nominal position values,
   determining with a measuring device actual position values of the machine part in relation to the single axis, and
   displaying the actual position values of the machine part only in relation to the single axis graphically in a circular representation.

2. The method of claim 1, wherein visualizing comprises plotting a deviation of an actual position value from a corresponding nominal position value at a specific angle of the sine function.

3. The method of claim 1, wherein the actual position values are determined for at least one and a quarter period of the sine function and stored, wherein the circular representation comprises an orthogonal coordinate system having a first axis and a second axis, wherein values along the first axis correspond to the actual position values and values along the second axis correspond to the actual position values shifted by the one quarter period duration with respect to the actual position values.

4. The method of claim 3, wherein the actual position value trailing by one quarter period duration is interpolated from at least two determined actual position values.

5. The method of claim 1, wherein the actual position values for at least one complete period of the sine function are visualized graphically in the circular representation.

6. The method of claim 1, wherein the single axis is a linear axis and the machine part (1) is moved periodically back and forth along the linear axis in accordance with the sine function.

7. The method of claim 1, wherein the single axis is a rotary axis and the machine part is pivoted periodically back and forth about a rotary axis in accordance with the sine function.

8. A measuring device for checking a positioning accuracy of a machine part that is displaceable with respect to at least one axis, comprising:
   a controller specifying nominal position values of the machine part in relation to a single axis, wherein the nominal position values are defined by a sine function,
   a drive constructed to displace the machine part with respect to the single axis in accordance with the nominal position values,
   the measuring device determining actual position values of the machine part in relation to the single axis, and
   a display displaying actual position values of the machine part only in relation to the single axis graphically in a circular representation.

* * * * *